US009508392B2

(12) United States Patent
Kyle et al.

(10) Patent No.: US 9,508,392 B2
(45) Date of Patent: Nov. 29, 2016

(54) SYSTEMS AND METHODS FOR MECHANICAL ISOLATION OF INFORMATION HANDLING RESOURCES (71) Applicant: Dell Products L.P., Round Rock, TX (US)

(72) Inventors: Lawrence A. Kyle, Salado, TX (US); Robert Johnson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 111 days.

(21) Appl. No.: 14/541,362

(22) Filed: Nov. 14, 2014

(65) Prior Publication Data
US 2016/0141002 A1 May 19, 2016

(51) Int. Cl.
G11B 33/08 (2006.01)
H05K 7/18 (2006.01)
H05K 5/02 (2006.01)
G11B 33/12 (2006.01)

(52) U.S. Cl.
CPC ............. *G11B 33/08* (2013.01); *G11B 33/128* (2013.01)

(58) Field of Classification Search
CPC .......... G06F 1/181; G06F 1/183; G06F 1/16; G06F 1/186; G06F 1/187; G06F 1/185; H05K 5/0021; H05K 5/02; H05K 5/0204; H05K 5/0217; H05K 7/1427; H05K 7/142; H05K 7/1454; H05K 7/1487; H05K 7/1418; H05K 7/1421; H05K 7/1445; H05K 7/1489
See application file for complete search history.

(56) References Cited

U.S. PATENT DOCUMENTS 5,332,306 A * 7/1994 Babb ............... H05K 7/1418 312/223.1
7,123,474 B2 * 10/2006 Cho ................. G11B 33/08 206/523
8,388,305 B2 * 3/2013 Li .................... F04D 25/166 415/119
2005/0243507 A1 * 11/2005 Lambert .......... G06F 1/187 361/679.39
2008/0266813 A1 * 10/2008 Carlisi ............ G06F 1/183 361/727
2008/0285225 A1 * 11/2008 DeMoss .......... G06F 1/187 361/679.34
2014/0126129 A1 * 5/2014 Kyle ............... G06F 1/187 361/679.02
2014/0126171 A1 * 5/2014 Kyle ............... H01R 43/205 361/788
2014/0139996 A1 * 5/2014 Wu ................. G11B 33/128 361/679.34
2014/0240915 A1 * 8/2014 Phelan ............ G11B 33/128 361/679.31
2014/0285991 A1 * 9/2014 Wang ............... H05K 7/1489 361/807
2015/0293566 A1 * 10/2015 Ehlen .............. G06F 1/187 361/679.33
2015/0378402 A1 * 12/2015 Nakano ........... G11B 33/08 361/679.34

* cited by examiner

Primary Examiner — Courtney Smith
Assistant Examiner — Michael Matey
(74) Attorney, Agent, or Firm — Jackson Walker L.L.P.

(57) ABSTRACT

In accordance with embodiments of the present disclosure, a system may include a structural member and an isolator/guide. The structural member may define at least a portion of each of two laterally adjacent bays, each bay for receiving a respective modular information handling resource. The isolator/guide may be mechanically coupled to the structural member and include at least one guide pin and a vibrational isolator. The at least one guide pin may be configured to engage with modular information handling resources disposed in each of the two laterally adjacent bays in order to mechanically guide the modular information handling resources during insertion into and removal from the bays. The vibrational isolator may be mechanically coupled between the structural member and the at least one guide pin such that the vibrational isolator provides vibrational isolation between the at least one guide pin and the structural member.

15 Claims, 12 Drawing Sheets

SYSTEMS AND METHODS FOR MECHANICAL ISOLATION OF INFORMATION HANDLING RESOURCES

TECHNICAL FIELD

The present disclosure relates to modular information handling systems. More specifically, embodiments of the disclosure provide systems and methods for providing mechanical isolation, including vibrational isolation, of information handling resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Oftentimes, information handling systems and other information handling resources (e.g., storage devices, input/output devices, and other peripheral devices) are each manufactured in a modular form factor and may be configured to be disposed in a chassis configured to receive such modular components. Such a chassis and its component modular information handling systems and information handling resources typically include various rails, carriers, and other mechanical components allowing for a person to add and remove the modular information handling systems and information handling resources from the chassis. Many types of information handling resources, such as hard disk drives, may be sensitive to vibration. For example, cooling fans and other electromechanical devices may cause vibration and/or other mechanical shock to information handling resources that may degrade performance and/or cause damage to such information handling resources. In addition, in many high-density storage modules, hard disk drives may reside in an extending drawer that may experience mechanical shock upon opening and closing of the drawer.

SUMMARY

In accordance with the teachings of the present disclosure, the disadvantages and problems associated with vibrational shock to information handling resources may be reduced or eliminated.

In accordance with embodiments of the present disclosure, a system may include a structural member and an isolator/guide. The structural member may define at least a portion of each of two laterally adjacent bays, each bay for receiving a respective modular information handling resource. The isolator/guide may be mechanically coupled to the structural member and include at least one guide pin and a vibrational isolator. The at least one guide pin may be configured to engage with modular information handling resources disposed in each of the two laterally adjacent bays in order to mechanically guide the modular information handling resources during insertion into and removal from the bays. The vibrational isolator may be mechanically coupled between the structural member and the at least one guide pin such that the vibrational isolator provides vibrational isolation between the at least one guide pin and the structural member.

In accordance with these and other embodiments of the present disclosure, an information handling system may include a chassis and a drawer. The drawer may be mechanically coupled to the chassis and may have a plurality of bays, each bay configured to receive a modular information handling resource. The drawer may include a structural member and an isolator/guide. The structural member may define at least a portion of each of two laterally adjacent bays, each bay for receiving a respective modular information handling resource. The isolator/guide may be mechanically coupled to the structural member and include at least one guide pin and a vibrational isolator. The at least one guide pin may be configured to engage with modular information handling resources disposed in each of the two laterally adjacent bays in order to mechanically guide the modular information handling resources during insertion into and removal from the bays. The vibrational isolator may be mechanically coupled between the structural member and the at least one guide pin such that the vibrational isolator provides vibrational isolation between the at least one guide pin and the structural member.

In accordance with these and other embodiments of the present disclosure, a method may include forming an isolator/guide by mechanically coupling at least one guide pin to a vibrational isolator and mechanically coupling the isolator/guide to a structural member defining at least a portion of each of two laterally adjacent bays, each bay receiving a respective modular information handling resource. The at least one guide pin may be configured to engage with modular information handling resources disposed in each of the two laterally adjacent bays in order to mechanically guide the modular information handling resources during insertion into and removal from the bays. The vibrational isolator may be mechanically coupled between the structural member and the at least one guide pin such that the vibrational isolator provides vibrational isolation between the at least one guide pin and the structural member.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-11, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

In this disclosure, the term "information handling resource" may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

Figure 1:
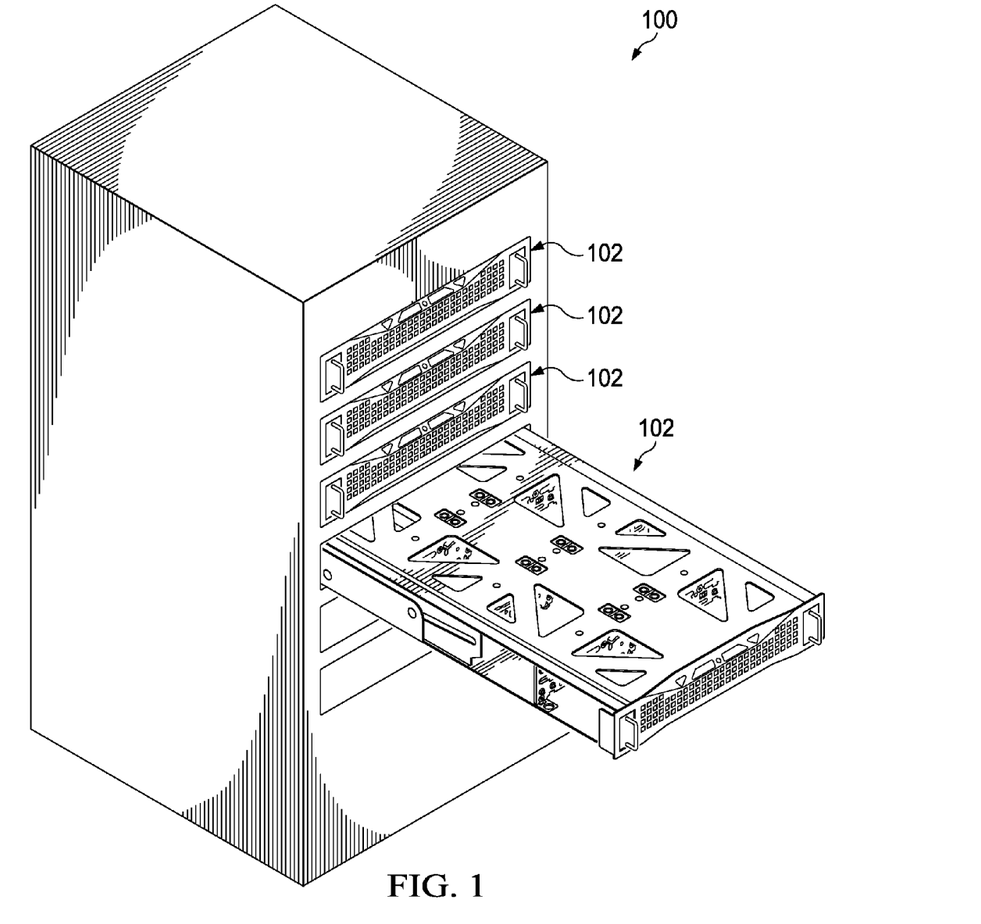
FIG. 1 illustrates a perspective view of a chassis for receiving modular information handling resources, in accordance with embodiments of the present disclosure.

FIG. 1 illustrates a perspective view of a chassis 100 for receiving modular information handling resources, in accordance with embodiments of the present disclosure. Chassis 100 may be an enclosure that serves as a container for various information handling systems and information handling resources, and may be constructed from steel, aluminum, plastic, and/or any other suitable material. Although the term "chassis" is used, chassis 100 may also be referred to as a case, cabinet, tower, box, enclosure, and/or housing. In certain embodiments, chassis 100 may be configured to hold and/or provide power to a plurality of information handling systems and/or information handling resources. As depicted in FIG. 1, chassis 100 may include one or more drawers 102 for receiving information handling resources, as described in greater detail below.

Figure 2:
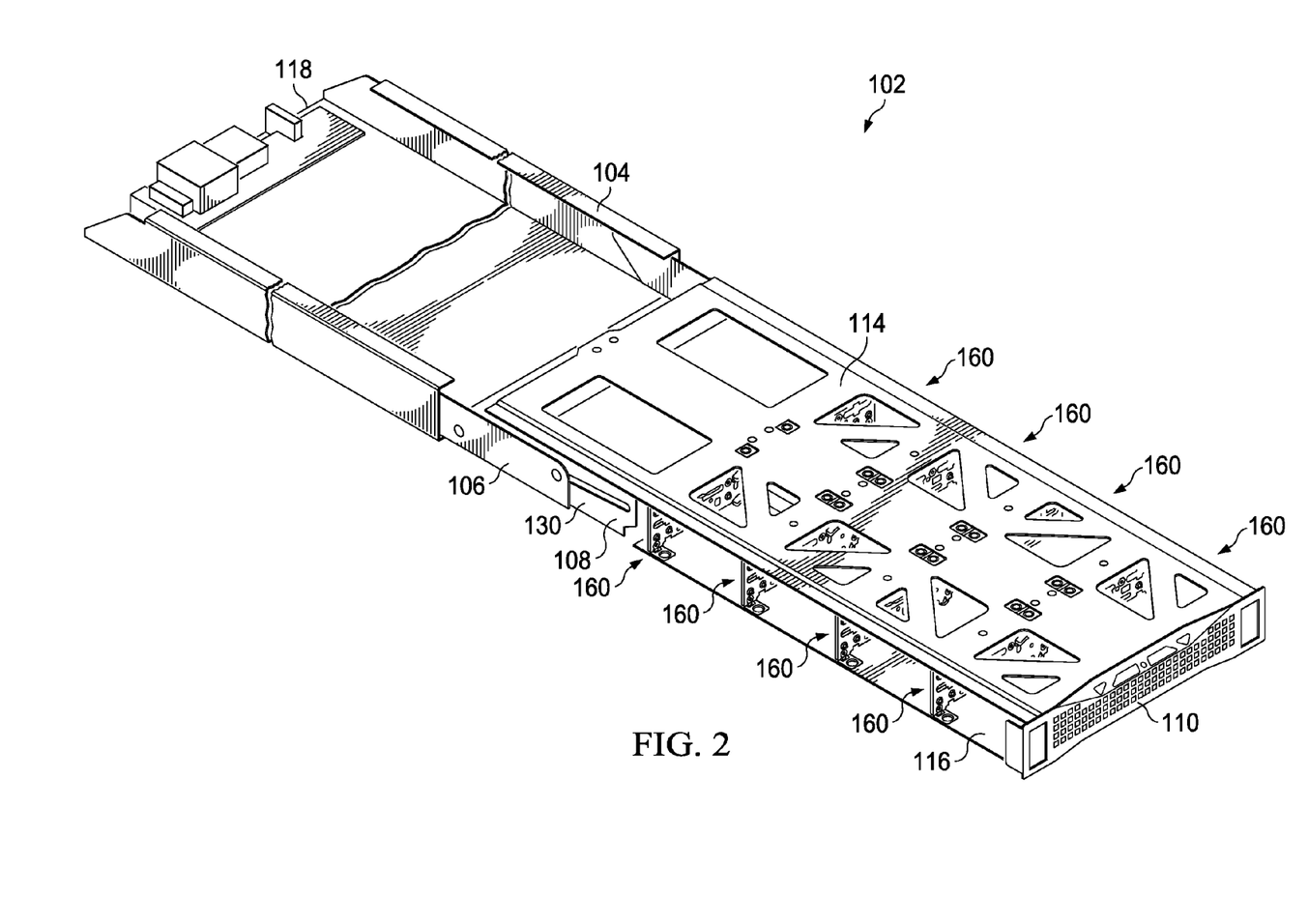
FIG. 2 illustrates a perspective view of an example chassis drawer for receiving modular information handling resources, the drawer in an open position, in accordance with embodiments of the present disclosure.
Figure 3:
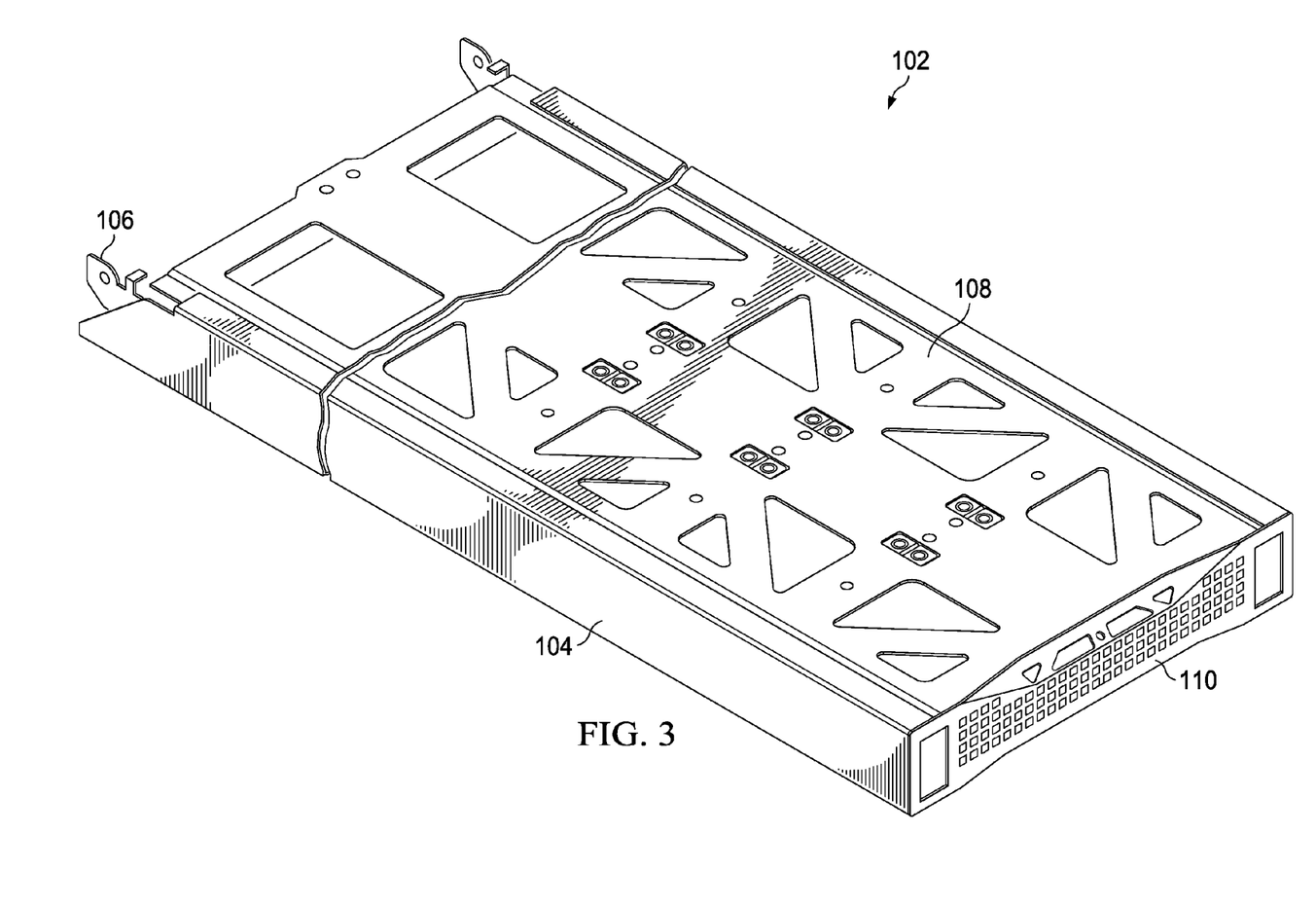
FIG. 3 illustrates a perspective view of an example chassis drawer for receiving modular information handling resources, the drawer in a closed position, in accordance with embodiments of the present disclosure.
Figure 4:
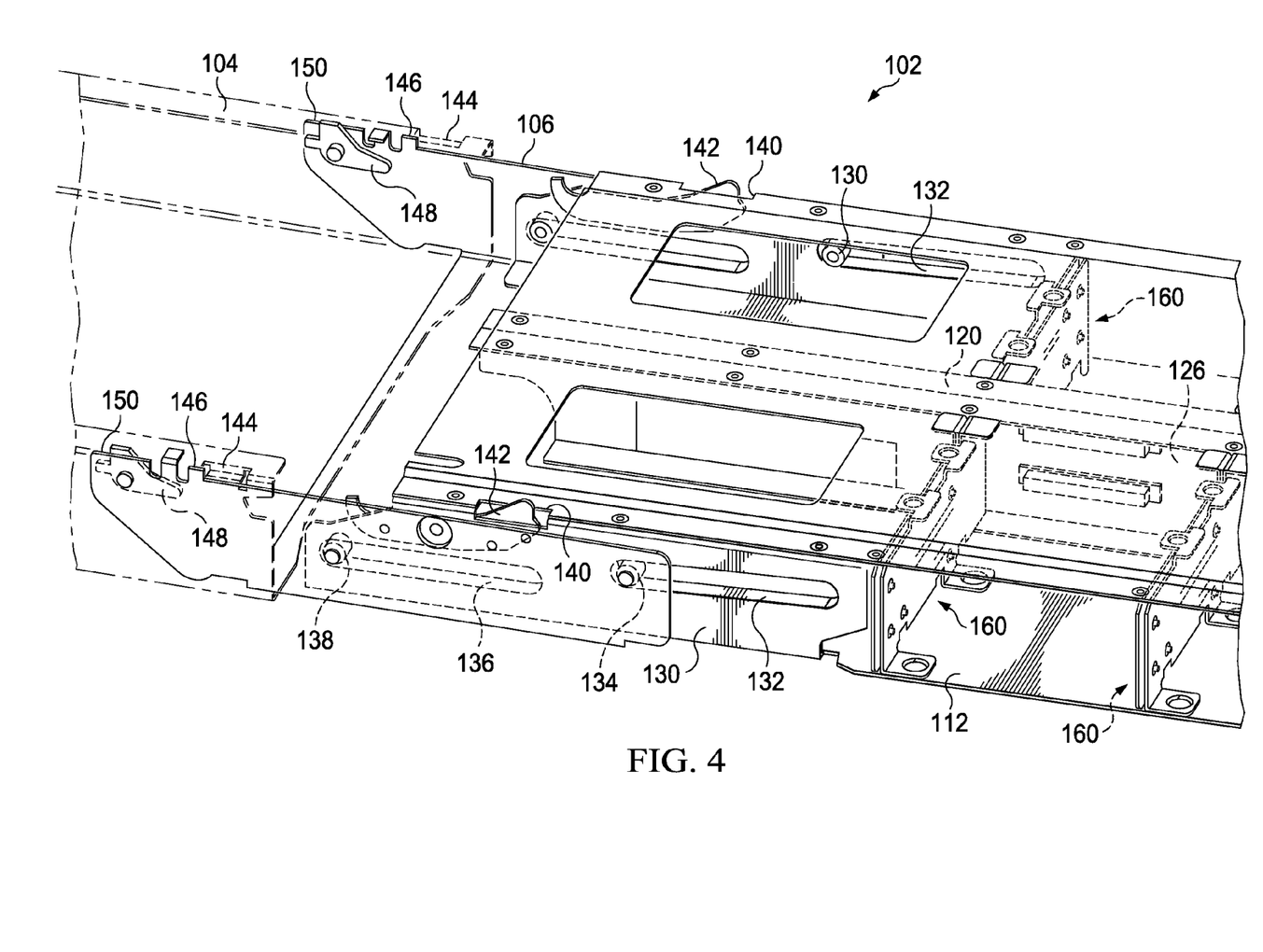
FIG. 4 illustrates a perspective view of selected components of the chassis drawer depicted in FIGS. 2 and 3, in accordance with embodiments of the present disclosure.
Figure 5:
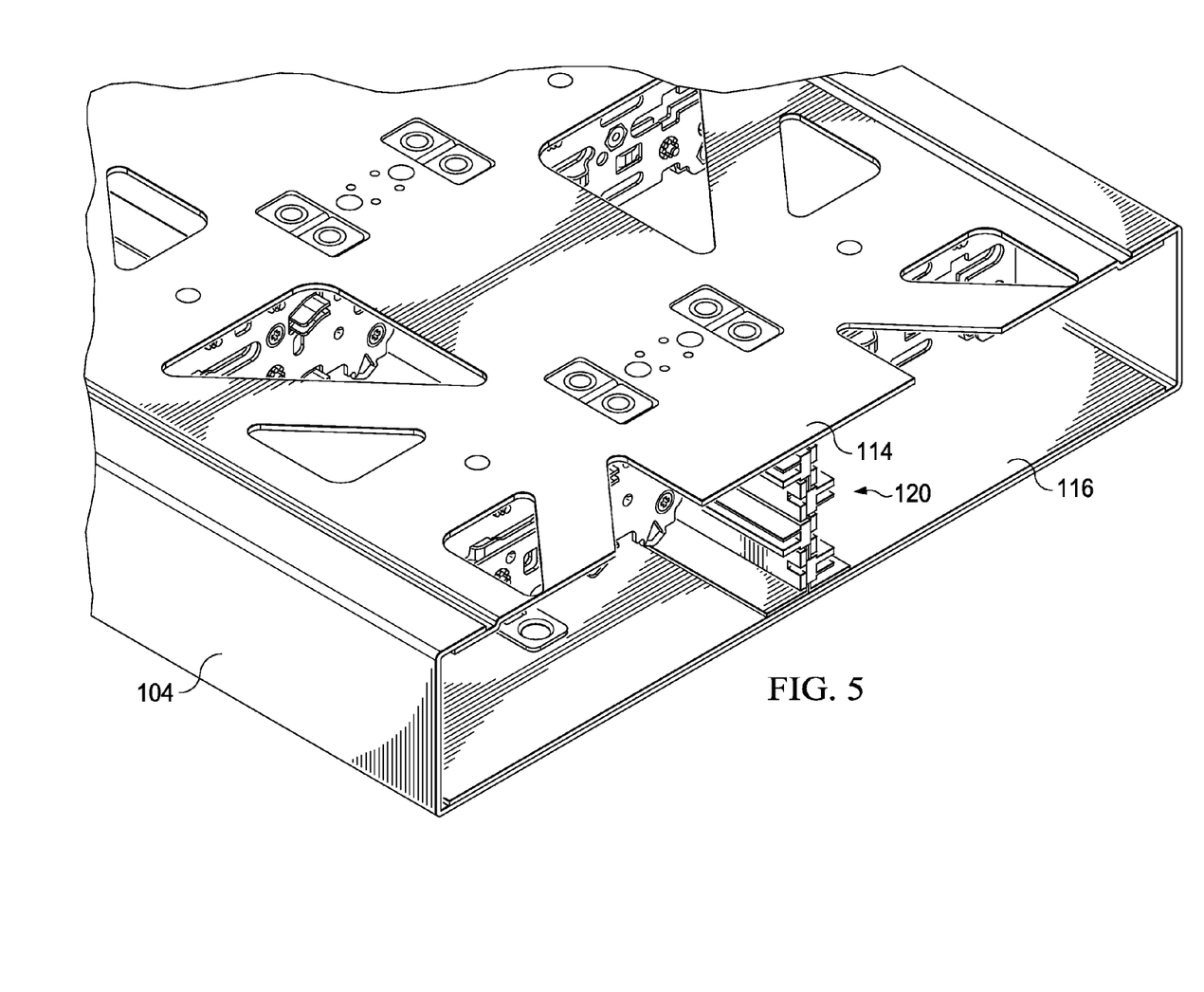
FIG. 5 illustrates a perspective view of selected components of an example carrier member of the chassis drawer depicted in FIGS. 2 and 3, in accordance with embodiments of the present disclosure.
Figure 6:
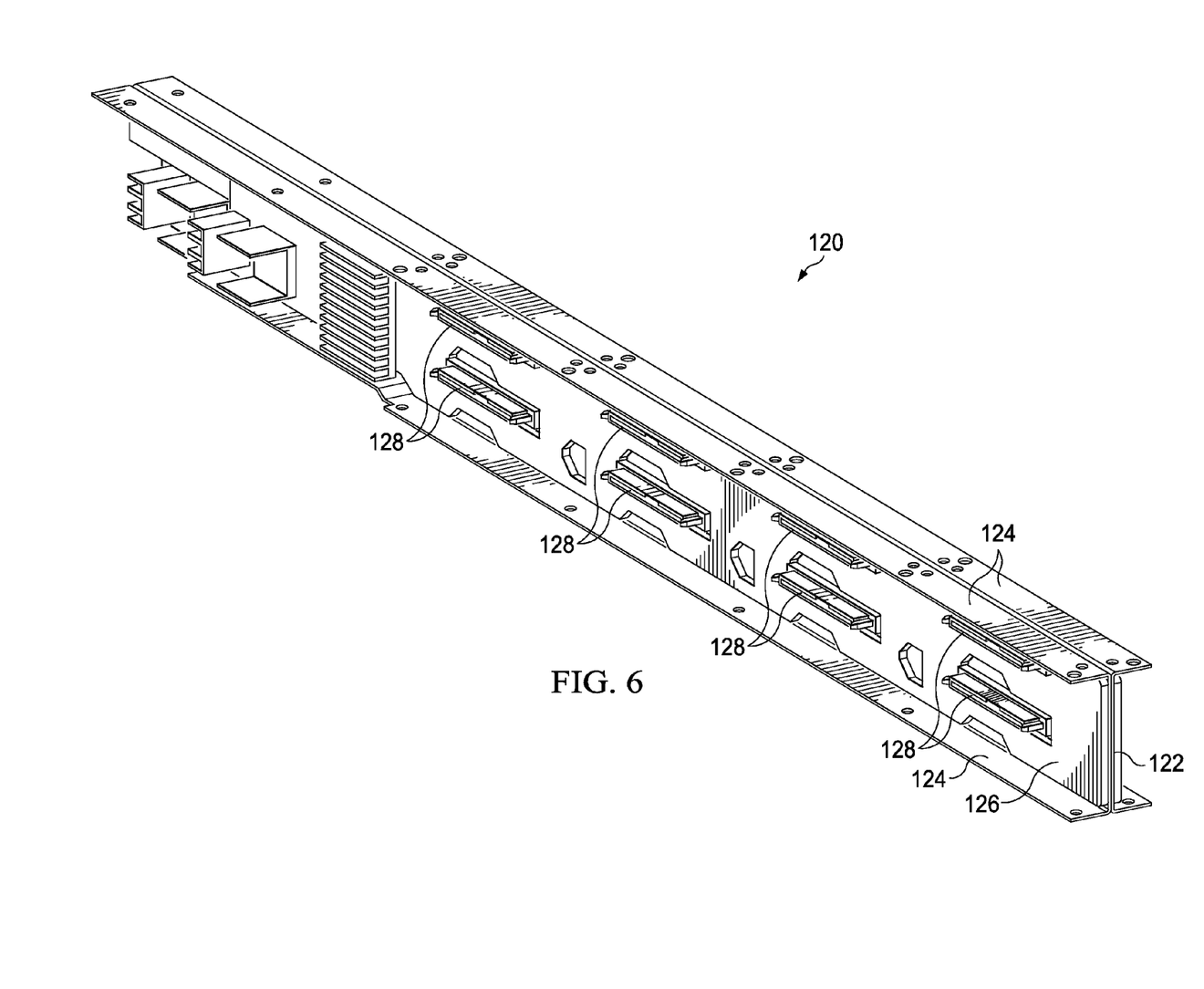
FIG. 6 illustrates a perspective view of an example center spine of the carrier member depicted in FIG. 5, in accordance with embodiments of the present disclosure.

FIGS. 2-6 depict various views of an example chassis drawer 102 for receiving modular information handling resources, in accordance with embodiments of the present disclosure. FIG. 2 illustrates a perspective view of an example chassis drawer 102 for receiving modular information handling resources, wherein drawer 102 is in an open position drawn from chassis 100, in accordance with embodiments of the present disclosure. FIG. 3 illustrates a perspective view of chassis drawer 102 for receiving modular information handling resources, wherein drawer 102 is in a closed position relative to chassis 100, in accordance with embodiments of the present disclosure. FIG. 4 illustrates a perspective view of selected components of chassis drawer 102 depicted in FIGS. 2 and 3, in accordance with embodiments of the present disclosure. FIG. 5 illustrates a perspective view of selected components of an example carrier member 108 of chassis drawer 102 depicted in FIGS. 2 and 3, in accordance with embodiments of the present disclosure. FIG. 6 illustrates a perspective view of an example center spine 120 of carrier member 108 depicted in FIG. 5, in accordance with embodiments of the present disclosure.

As shown in FIGS. 2-4, chassis drawer 102 may comprise an inner member 104, an intermediate member 106 mechanically coupled to inner member 104, and a carrier member 108 mechanically coupled to intermediate member 106. Inner member 104 may be constructed from steel, aluminum, plastic, and/or any other suitable material. Although inner member 104 may have any suitable size and/or shape, inner member 104 is depicted in the embodiments of FIGS. 2-4 as having two substantially planar and parallel opposite sides defining a drawer height coupled to each other by a substantially planar bottom generally perpendicular to the sides defining a drawer width and a guide flange extending from and running perpendicular to and along the length of each side such that the flanges project towards each other. In some embodiments, inner member 104 may be mechanically coupled to the internal mechanical structure of chassis 100, such that inner member 104 is fixed relative to chassis 100.

Intermediate member 106 may be constructed from steel, aluminum, plastic, and/or any other suitable material. Although intermediate member 106 may have any suitable size and/or shape, intermediate member 106 is depicted in the embodiments of FIGS. 2-4 as having two generally parallel and planar opposite sides coupled to each other by a substantially planar bottom generally perpendicular to the sides. The height of the sides and the width of the bottom may be such that the corresponding sides and bottom of inner member 104 provide a mechanical guide for intermediate member 106 as chassis drawer 102 is opened and closed. Intermediate member 106 may be mechanically coupled to inner member 104 via bearings and/or other mechanical components such that intermediate member 106 may slide relative to inner member 104 in a direction perpendicular to the drawer height and drawer width defined by inner member 104. As shown in FIG. 4, intermediate member 106 may be limited in the distance it may be drawn from chassis 100 through any combination of suitable structural elements. For example, in the embodiments represented by FIG. 4, translational movement of intermediate member 106 from the chassis may be limited by flanges 146 extending from the sides of intermediate member 106 and towards each other and corresponding depressions 144 formed at the interior corner of inner member 104 defined by a side and flange of inner member 104. Similarly, other mechanical components may restrict motion of intermediate member 106 relative to inner member 104 as chassis drawer 102 is translated from the open position to the closed position. For example, in the embodiments represented by FIG. 4, intermediate member 104 may have one or more spring-loaded cams 148 mounted to the interior of the sides of intermediate member 106. As chassis drawer 102 is translated from a closed position to an open position, a projection of cam 148 may, as a result of spring force, engage with a corresponding opening 150 of a flange 146 of inner member 104. Accordingly, cam 148 may lock the motion of intermediate member 106 relative to inner member 104 until, upon translation of chassis drawer 102 from the open position to the closed position, carrier member 108 or another component of chassis drawer 102 engages with cam 148 to cause the projection of cam 148 to disengage from opening 150, allowing intermediate member 106 to again slide relative to inner member 104.

Carrier member 108 may be constructed from steel, aluminum, plastic, and/or any other suitable material. Although carrier member 108 may have any suitable size and/or shape, carrier member 108 is depicted in the embodiments of FIGS. 2-5 as having a substantially planar top 114 and a substantially planar bottom 116 generally parallel to each other defining a width and depth of carrier member 108, the top 114 and bottom 116 mechanically coupled to each other by a carrier spine 120 defining a height of carrier member 108, such that top 114 and bottom 116 are generally perpendicular to the sides of intermediate member 106. In some embodiments, carrier spine 120 may run a portion of the depth of carrier member 108 such that in such portion, carrier spine 120 is located at approximately the center of the width of carrier member 108. Carrier member 108 may also include a face 110 mechanically affixed to top 114, bottom 116, and/or carrier spine 120. As shown in FIGS. 2-5, top 114 may include one or more openings (e.g., above bays 112) allowing for gaseous fluid to pass through. Similarly, bottom 116 may also include one or more openings (e.g., below bays 112) allowing for gaseous fluid to pass through.

In some embodiments, face 110 may be substantially equal to the width of carrier member 108 and substantially equal to the height of carrier member 108. In these and other embodiments, face 110 may include handles, pull tabs, and/or other features allowing a person to pull on face 110 in order to translate chassis drawer 102 from a closed position to an open position in a direction generally parallel to the depth of top 114 and bottom 116. In these and other embodiments, face 110 may include a grill, vent, and/or other opening allowing gaseous fluid to enter and/or exit through face 110.

As shown in FIGS. 2 and 4, each side of carrier member 108 (e.g., portions of carrier member 108 between the edges of top 114 and bottom 116 and parallel to carrier spine 120) may include a web 130 configured to mechanically couple carrier member 108 to intermediate member 106, as well as openings for a plurality of bays 112. As shown in the embodiments represented by FIG. 4, web 130 of carrier member 108 may have openings 132 and 136 configured to engage with bearings 134 and 138, respectively of intermediate member 106. Accordingly, openings 132 and 136 may restrict movement of carrier member 108 relative to intermediate member 106.

Similarly, other mechanical components may restrict motion of carrier member 108 relative to intermediate member 106 as chassis drawer 102 is translated from the closed position to the open position. For example, in the embodiments represented by FIG. 4, carrier member 108 may have a cam 142 mechanically coupled to one or both of the opposite sides of carrier member 108. A spring force of cam 142 may bias cam 142 such that a portion thereof extends through a corresponding opening 140 of carrier member 108. While chassis drawer 102 is translated from an open position to a closed position, cam 142 may be rotated via mechanical interaction of guide flanges of inner member 104 with an end of cam 142 extending through opening 140. Such rotation may cause an opposite end of cam 142 to engage with cam 148 of inner member 104 (e.g. near opening 150), thus restricting movement of carrier member 108 relative to intermediate member 106 in the outward direction of chassis drawer 102. Accordingly, when chassis drawer 102 is translated from a closed position to an open position, cam 142 may remain engaged with cam 148 until such time as carrier member 108 is withdrawn sufficiently so as to allow cam 142 to rotate through opening 140 to its spring-biased position, such that chassis member 108 is movable relative to intermediate member 106.

Also, as depicted in FIG. 4, openings 132 and/or 136 may be sloped so that as chassis drawer 102 is opened, the engagement of bearings 134 and/or 138 with openings 132 and/or 136, respectively, may cause carrier member 108 to tilt slightly upward from chassis 100 to face 110, in order to counteract the downward force caused by the weight of chassis drawer 102 and the various information handling resources disposed therein.

In the embodiments represented by FIG. 6, carrier spine 120 may include a substantially planar center member 122 and two flanges 124 generally perpendicular to center member 122 and projecting from each other on a top edge of center member 122 and two flanges 124 generally perpendicular to center member 122 and projecting from each other on a bottom edge of center member 122, the bottom edge opposite the top edge. Accordingly, carrier spine 120 may be structurally similar to an I-beam. In some embodiments, center member 122 and flanges 124 may be formed from the same piece of material. In other embodiments, center member 122 and flanges 124 may be formed from different pieces of material. For example, in some embodiments, carrier spine 120 may be constructed of two U-shaped pieces configured back to back and attached to each other via adhesive and/or mechanical fasteners. In these and other embodiments, flanges 124 may include one or more openings for receiving mechanical fasteners to mechanically couple flanges 124 to top 114 or bottom 116 via corresponding openings in top 114 or bottom 116.

As shown in FIGS. 4-6, a backplane 126 may be mechanically coupled to carrier spine 120. Backplane 126 may comprise any system, device, or apparatus configured to interconnect modular information handling resources inserted into bays 112 (e.g., hard disk drives) with each other and/or to other information handling resources of chassis 100. Accordingly, backplane 126 may include slots 128 and/or other connectors configured to receive corresponding electrical connectors of information handling resources in order to electrically couple information handling resources inserted into bays 112 to backplane 126. In some embodiments, backplane 126 may be configured to receive information handling resources on each side of center member 122, such that information handling resources on opposite sides of center member 122 are oriented "back-to-back" with respect to each other. In these and other embodiments, backplane 126 may comprise either a single printed circuit board coupled to center spine 120 with slots 128 mounted to each side or may comprise two electrically separate printed circuit boards coupled to center spine 120 in a back-to-back manner with slots 128 mounted on each printed circuit board. In some embodiments, one or more printed circuit boards comprising backplane 126 may form all or a portion of center member 122 and may comprise all or a portion of the mechanical structure for supporting the various flanges 124 of carrier spine 120.

In some embodiments, all slots 128 of backplane 126 may be configured to receive identical or similar information handling resources having substantially similar form factors and/or functionality (e.g., 2.5-inch hard disk drives). In other embodiments, some slots 128 may be configured to receive an information handling resource different in form factor and/or functionality than that for which another slot 128 is configured.

As shown in FIG. 2, chassis drawer 102 may have an interface connector 118 configured to electrically couple to backplane 126 when chassis drawer 102 is closed thus providing electrical coupling between information handling resources disposed in bays 112 and other information handling resources of chassis 100.

As shown in FIG. 2, carrier member 108 may have a plurality of bays 112 opening to each side of carrier member 108. Each of such bays 112 may be defined by an associated backplane 126 and one or more structural elements of carrier member 108. For example, chassis drawer 102 may include a plurality of support members 160, such that laterally adjacent bays 112 (e.g., bays 112 adjacent in a direction of the depth of carrier member 108) are separated by a support member 160. In addition, each support member 160 may have a plurality of guide pins for mechanically guiding an information handling resource into and out of a bay 112 and providing for mechanical isolation of information handling resources in contact with such guide pins. Detail regarding the structure and function of support members 160 is set forth below with reference to FIGS. 7A-10B. Accordingly, a bay 112 may be configured to allow modular information handling resources to be easily inserted and removed from the bay 112 as desired by a user.

Although carrier member 108 may be constructed so as to support any suitable arrangement of bays 112, in the embodiments represented by FIGS. 2 and 4, carrier member 108 is configured with 16 bays 112, eight on each side of carrier spine 120 and arranged on each side of carrier spine 120 such that two drives may be oriented one over the other in each of four openings.

In some embodiments, all bays 112 of carrier member 108 may be configured to receive identical or similar information handling resources having substantially similar form factors and/or functionality (e.g., 2.5-inch hard disk drives). In other embodiments, some bays 112 may be configured to receive an information handling resource different in form factor and/or functionality than that for which another bay 112 is configured.

Accordingly, chassis drawer 102 may be drawn open allowing full-extension of carrier member 108 such that a person may access bays 112 to add and/or remove information handling resources from chassis drawer 102. In addition, chassis drawer 102 may be closed such that carrier member 108 is substantially telescoped within the depth of inner member 104 such that face 110 is generally parallel with a side of chassis 100.

Figure 7A:
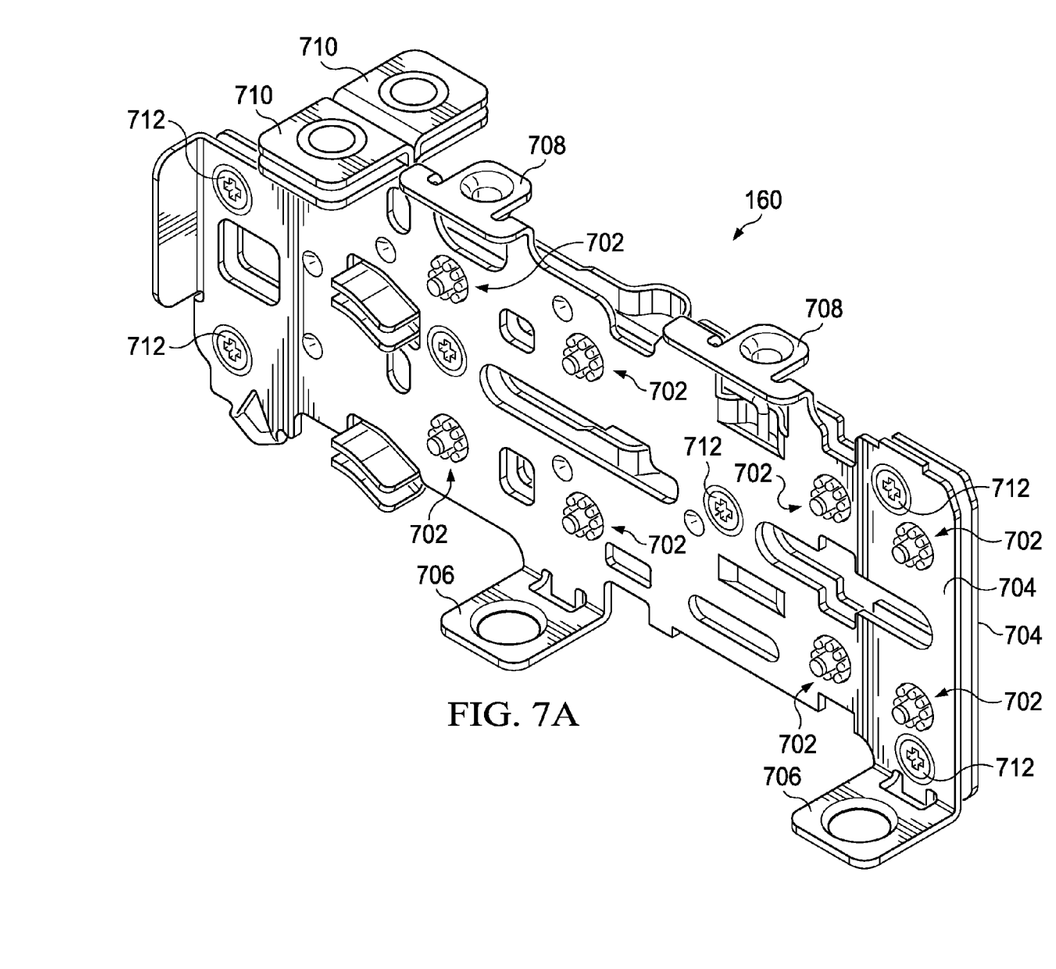
FIG. 7A illustrates a perspective view of one side of a support member of the chassis drawer depicted in FIGS. 2-4, in accordance with embodiments of the present disclosure.
Figure 7B:
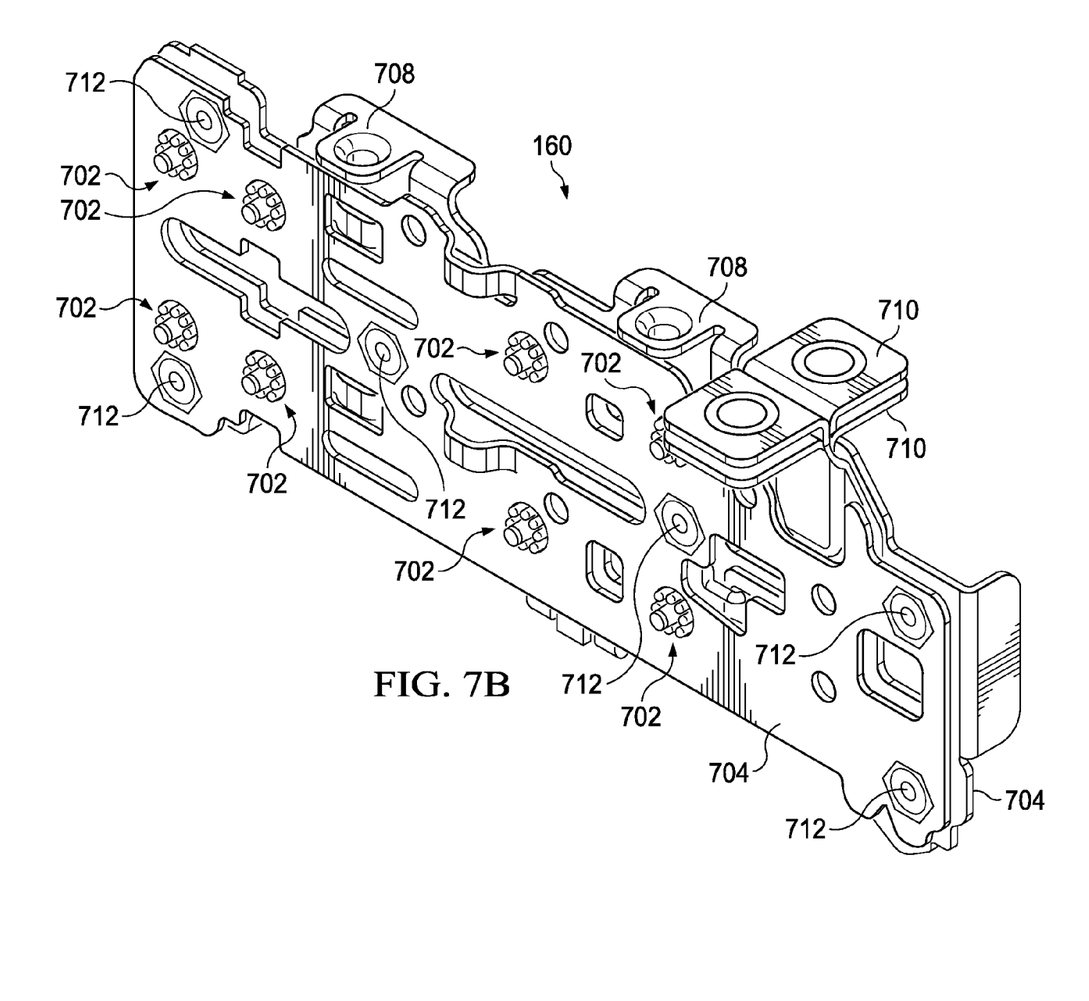
FIG. 7B illustrates a perspective view of another side of the support member depicted in FIG. 7A, in accordance with embodiments of the present disclosure.

FIGS. 7A and 7B illustrate perspective views of opposite sides of a support member 160, in accordance with embodiments of the present disclosure. As shown in FIGS. 7A and 7B, a support member 160 may include two side walls 704 and a plurality of isolator/guides 702. Each side wall 704 may have a generally planar shape and/or may be constructed from metal (e.g., aluminum, steel) or any other suitable material. Side walls 704 may be coupled to each other via one or more fasteners 712 (e.g., screws) such that side walls 704 are substantially parallel to one another. One or both side walls 704 may comprise mounting features 706, 708, and/or 710 for mechanically coupling support member 160 to carrier member 108. For example, mounting features 706 may comprise flanges having openings for receiving a fastener (e.g., screw) for mechanically coupling support member 160 to bottom 116. As another example, mounting features 706, 708 may comprise flanges having openings for receiving a fastener (e.g., screw) for mechanically coupling support member 160 to top 114.

Figure 8:
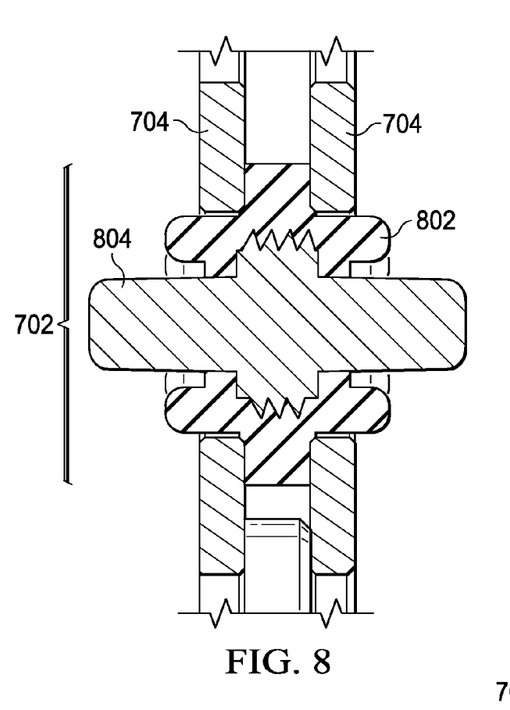
FIG. 8 illustrates a cross section of an example support member, in accordance with embodiments of the present disclosure.
Figure 9:
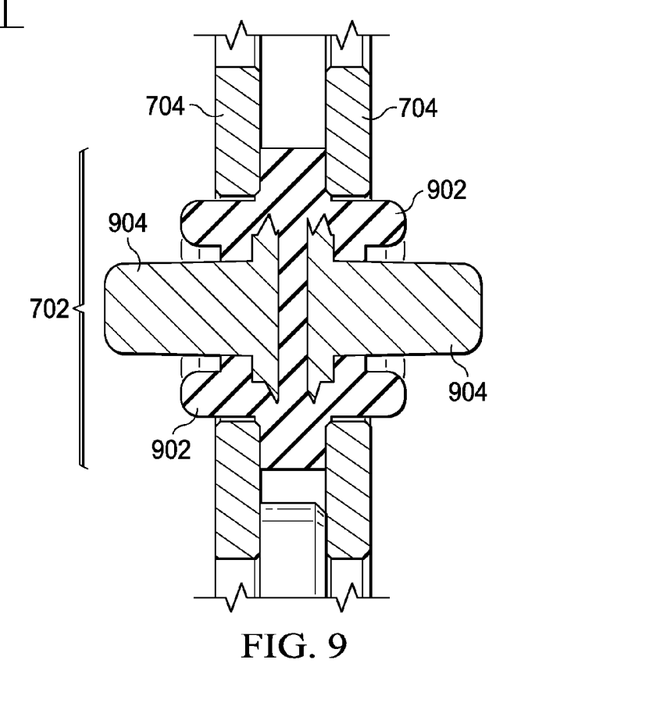
FIG. 9 illustrates a cross section of another example support member, in accordance with embodiments of the present disclosure.

As also shown in FIGS. 7A and 7B, sidewalls 704 may have openings formed therein for mechanically supporting a plurality of isolator/guides 702. To further illustrate sidewalls 704 and isolator/guides 702, FIGS. 8 and 9 each depict cross sections of example support members 160, in accordance with embodiments of the present disclosure. As shown in FIGS. 8 and 9, sidewalls 704 may have aligned openings, such that a pair of aligned openings may mechanically support a single isolator/guide 702 such that the single isolator/guide 702 provides guiding and mechanical vibrational isolation to information handling resources disposed in laterally adjacent bays 112 separated by the sidewalls 704.

As shown in FIG. 8, in some embodiments, an isolator/guide 702 may comprise a common guide pin 804 and a vibrational isolator 802 mechanically coupled between common guide pin 804 and sidewalls 704 such that vibrational isolator 802 provides vibrational isolation between sidewalls 704 and common guide pin 804. Common guide pin 804 may have a generally cylindrical shape except for mechanical features at or near the middle of the length of common guide pin 804 for mechanically coupling common guide pin 804 to vibrational isolator 802. Common guide pin 804 may be oriented such that an axis parallel to its length is substantially perpendicular to sidewalls 704. In some embodiments, common guide pin 804 may be constructed from metal (e.g., steel, aluminum) or other suitable material. In these and other embodiments, vibrational isolator 802 may be constructed from an elastomer material or any other suitable material for significantly eliminating the transfer of vibrational energy between sidewalls 704 and common guide pin 804.

As shown in FIG. 9, in some embodiments, an isolator/guide 702 may comprise two opposite guide pins 904 and a vibrational isolator 902 mechanically coupled between opposite guide pins 904 and sidewalls 704 such that vibrational isolator 902 provides vibrational isolation between sidewalls 704 and each guide pin 904. A guide pin 904 may have a generally cylindrical shape except for mechanical features at one end of the length of a guide pin 904 for mechanically coupling such guide pin 904 to vibrational isolator 902. Each guide pin 904 may be oriented such that an axis at its center and parallel to its length is substantially perpendicular to sidewalls 704 and substantially parallel to an axis at a center of and parallel to a length of the other guide pin 904 making up isolator/guide 702. In some embodiments, guide pins 904 may be constructed from metal (e.g., steel, aluminum) or other suitable material. In these and other embodiments, vibrational isolator 902 may be constructed from an elastomer material or any other suitable material for significantly eliminating the transfer of vibrational energy between sidewalls 704 and guide pins 904.

Support members 160 and their various guide pins 702 and sidewalls 704 (as well as, in some embodiments, backplane 126 and slots 128) may be appropriately sized, shaped, and arranged relative to each other so as to define the plurality of bays 112.

Figure 10A:
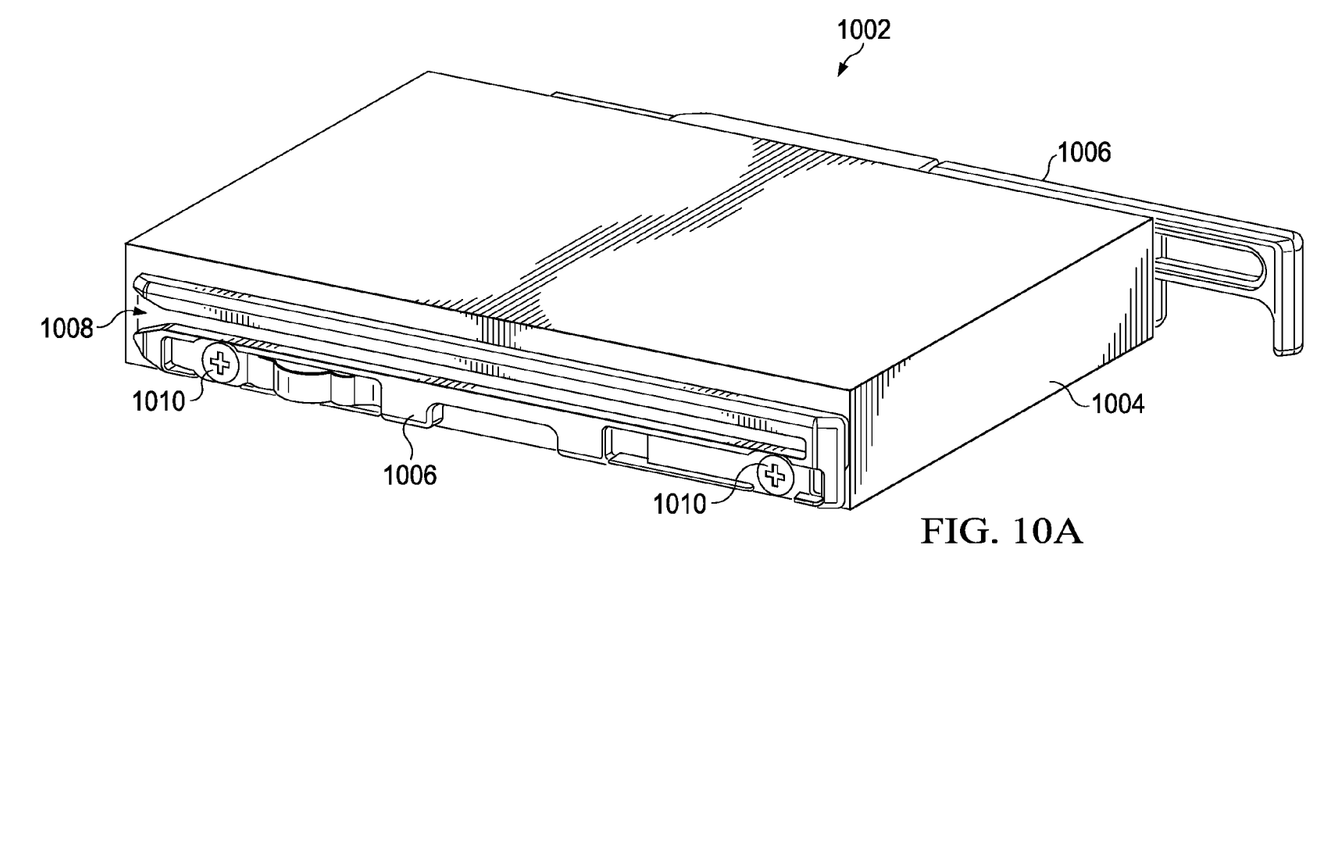
FIG. 10A illustrates a perspective view of one side of a modular information handling resource assembly that may be inserted into or removed from a bay of the chassis drawer depicted in FIGS. 2-4, in accordance with embodiments of the present disclosure.
Figure 10B:
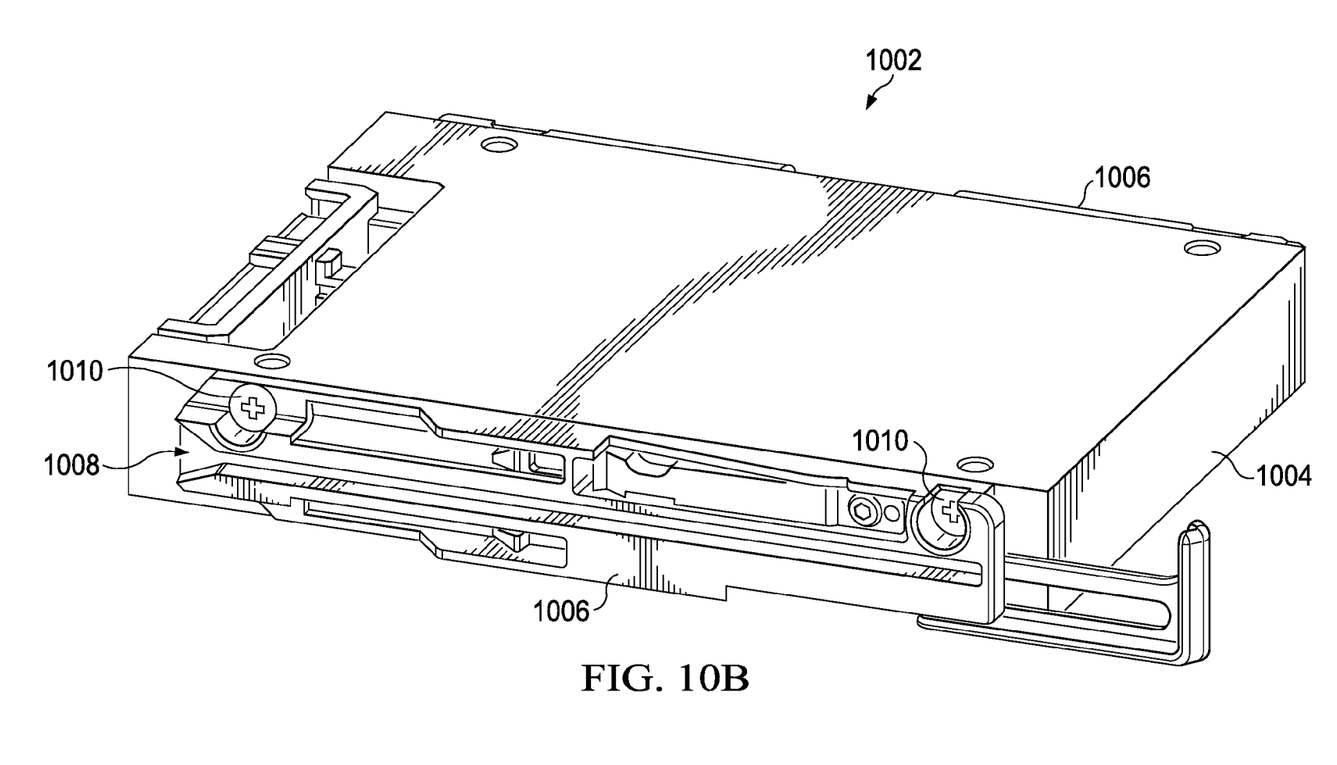
FIG. 10B illustrates a perspective view of another side of the modular information handling resource assembly depicted in FIG. 10A, in accordance with embodiments of the present disclosure.

FIGS. 10A and 10B illustrate perspective views of opposite sides of a modular information handling resource assembly 1002 that may be inserted and/or removed from a bay 112, in accordance with embodiments of the present disclosure. As shown in FIGS. 10A and 10B, a modular information handling resource assembly 1002 may comprise an information handling resource 1004 having mounted to opposite sides thereof rails 1006. An information handling resource 1004 may comprise any component system, device or apparatus of an information handling system, including without limitation processors, buses, memories, input-output devices and/or interfaces, storage resources, network interfaces, motherboards, electro-mechanical devices (e.g., fans), displays, and power supplies. In particular embodiments, an information handling resource 1004 may comprise a hard disk drive.

Each rail 1006 may be constructed from metal (e.g., steel, aluminum, etc.) or other suitable material and may include openings for mechanically coupling such rail 1006 to information handling resource 1004 via fasteners 1010 (e.g., screws). As shown in FIGS. 10A and 10B, each rail may include a guide channel 1008 that may engage with a corresponding guide pin 804/904 of an isolator/guide 702 in order to mechanically guide a modular information handling resource assembly 1002 during physical insertion and/or removal of such modular information handling resource assembly 1002 into/from a bay 112. In addition, when engaged with a rail 1006 via its guide pin 804/904, an isolator/guide 702 may provide for vibrational isolation and mechanical dampening between a modular information handling resource assembly 1002 and other structures (e.g., sidewalls 704) of carrier member 108. In some embodiments, the components of bays 112 may support hot plug insertion and removal of information resource assemblies 1002.

Figure 11:
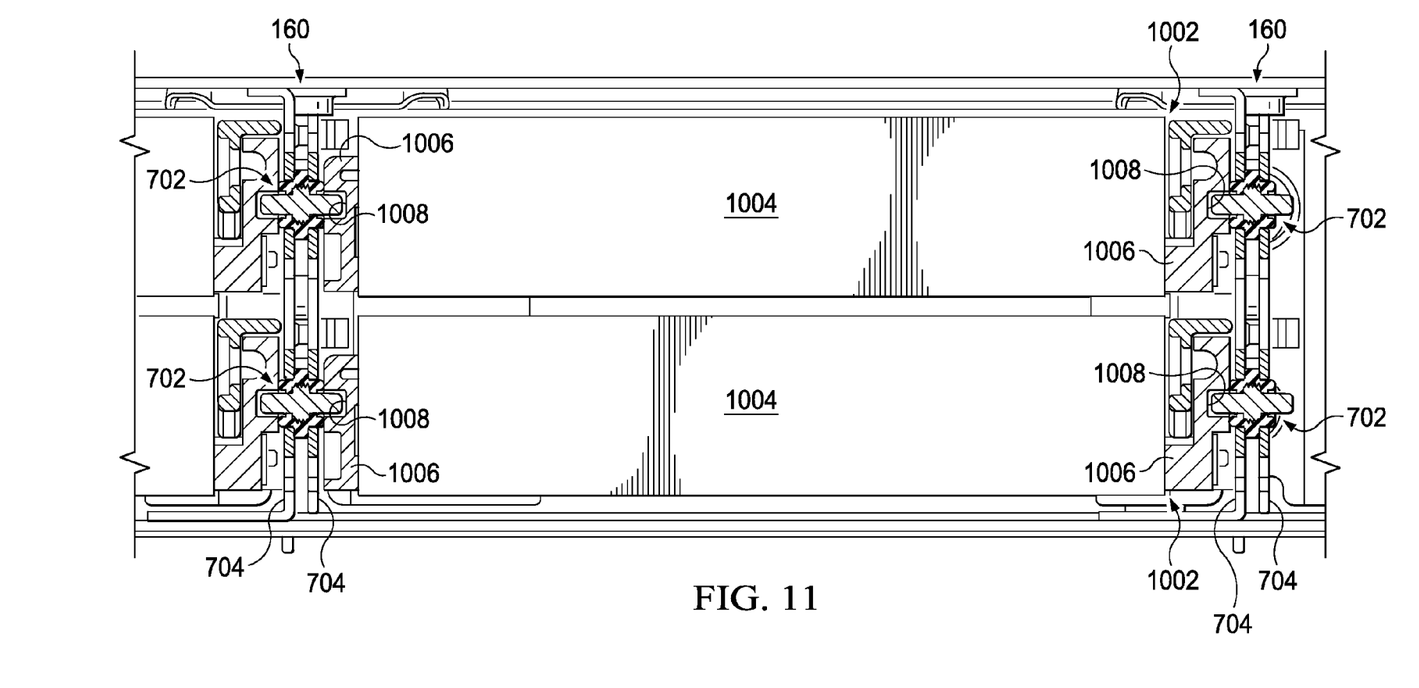
FIG. 11 illustrates an elevation view of modular information handling resource assemblies inserted into adjacent bays, in accordance with embodiments of the present disclosure.

FIG. 11 illustrates an elevation view of modular information handling resource assemblies 1002 inserted into adjacent bays 112, in accordance with embodiments of the present disclosure.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A system, comprising:
 a structural member defining at least a portion of each of two laterally adjacent bays, each bay for receiving a respective modular information handling resource assembly, each information handling resource assembly comprising a respective information handling resource; and
 an isolator/guide mechanically coupled to the structural member, the isolator/guide comprising:
  at least one guide pin configured to engage with modular information handling assemblies disposed in each of the two laterally adjacent bays in order to mechanically guide the modular information handling assemblies during insertion into and removal from the bays; and
  a vibrational isolator mechanically coupled between the structural member and the at least one guide pin such that the vibrational isolator provides vibrational isolation between the at least one guide pin and the structural member.

2. The system of claim 1, wherein the at least one guide pin comprises a single guide pin common to each of the two laterally adjacent bays and configured to engage with modular information handling assemblies disposed in each of the two laterally adjacent bays.

3. The system of claim 1, wherein the at least one guide pin comprises:
  a first guide pin configured to engage with a first modular information handling assembly disposed in a first bay of the two laterally adjacent bays; and
  a second guide pin configured to engage with a second modular information handling assembly disposed in a second bay of the two laterally adjacent bays;
  wherein the vibrational isolator is mechanically coupled between the first guide pin and the second guide pin such that the vibrational isolator provides vibrational isolation between the first guide pin and the second guide pin.

4. The system of claim 1, wherein the structural member comprises two parallel side walls mechanically coupled to one another.

5. The system of claim 1, wherein the vibrational isolator comprises an elastomer material.

6. An information handling system, comprising:
  a chassis; and
  a drawer mechanically coupled to the chassis having a plurality of bays, each bay configured to receive a modular information handling resource, the drawer comprising:
    a structural member defining at least a portion of each of two laterally adjacent bays, each bay for receiving a respective modular information handling resource assembly, each information handling resource assembly comprising a respective information handling resource; and
    an isolator/guide mechanically coupled to the structural member, the isolator/guide comprising:
      at least one guide pin configured to engage with modular information handling assemblies disposed in each of the two laterally adjacent bays in order to mechanically guide the modular information handling assemblies during insertion into and removal from the bays; and
      a vibrational isolator mechanically coupled between the structural member and the at least one guide pin such that the vibrational isolator provides vibrational isolation between the at least one guide pin and the structural member.

7. The information handling system of claim 6, wherein the at least one guide pin comprises a single guide pin common to each of the two laterally adjacent bays and configured to engage with modular information handling assemblies disposed in each of the two laterally adjacent bays.

8. The information handling system of claim 6, wherein the at least one guide pin comprises:
  a first guide pin configured to engage with a first modular information handling assembly disposed in a first bay of the two laterally adjacent bays; and
  a second guide pin configured to engage with a second modular information handling assembly disposed in a second bay of the two laterally adjacent bays;
  wherein the vibrational isolator is mechanically coupled between the first guide pin and the second guide pin such that the vibrational isolator provides vibrational isolation between the first guide pin and the second guide pin.

9. The information handling system of claim 6, wherein the structural member comprises two parallel side walls mechanically coupled to one another.

10. The information handling system of claim 6, wherein the vibrational isolator comprises an elastomer material.

11. A method, comprising:
  forming an isolator/guide by mechanically coupling at least one guide pin to a vibrational isolator; and
  mechanically coupling the isolator/guide to a structural member defining at least a portion of each of two laterally adjacent bays, each bay receiving a respective modular information handling resource assembly, each information handling resource assembly comprising a respective information handling resource;
  wherein:
    the at least one guide pin is configured to engage with modular information handling assemblies disposed in each of the two laterally adjacent bays in order to mechanically guide the modular information handling assemblies during insertion into and removal from the bays; and
    the vibrational isolator is mechanically coupled between the structural member and the at least one guide pin such that the vibrational isolator provides vibrational isolation between the at least one guide pin and the structural member.

12. The method of claim 11, wherein the at least one guide pin comprises a single guide pin common to each of the two laterally adjacent bays and configured to engage with modular information handling assemblies disposed in each of the two laterally adjacent bays.

13. The method of claim 11, wherein the at least one guide pin comprises:
  a first guide pin configured to engage with a first modular information handling assembly disposed in a first bay of the two laterally adjacent bays; and
  a second guide pin configured to engage with a second modular information handling assembly disposed in a second bay of the two laterally adjacent bays;
  wherein the vibrational isolator is mechanically coupled between the first guide pin and the second guide pin such that the vibrational isolator provides vibrational isolation between the first guide pin and the second guide pin.

14. The method of claim 11, wherein the structural member comprises two parallel side walls mechanically coupled to one another.

15. The method of claim 11, wherein the vibrational isolator comprises an elastomer material.

* * * * *